Figure 1:
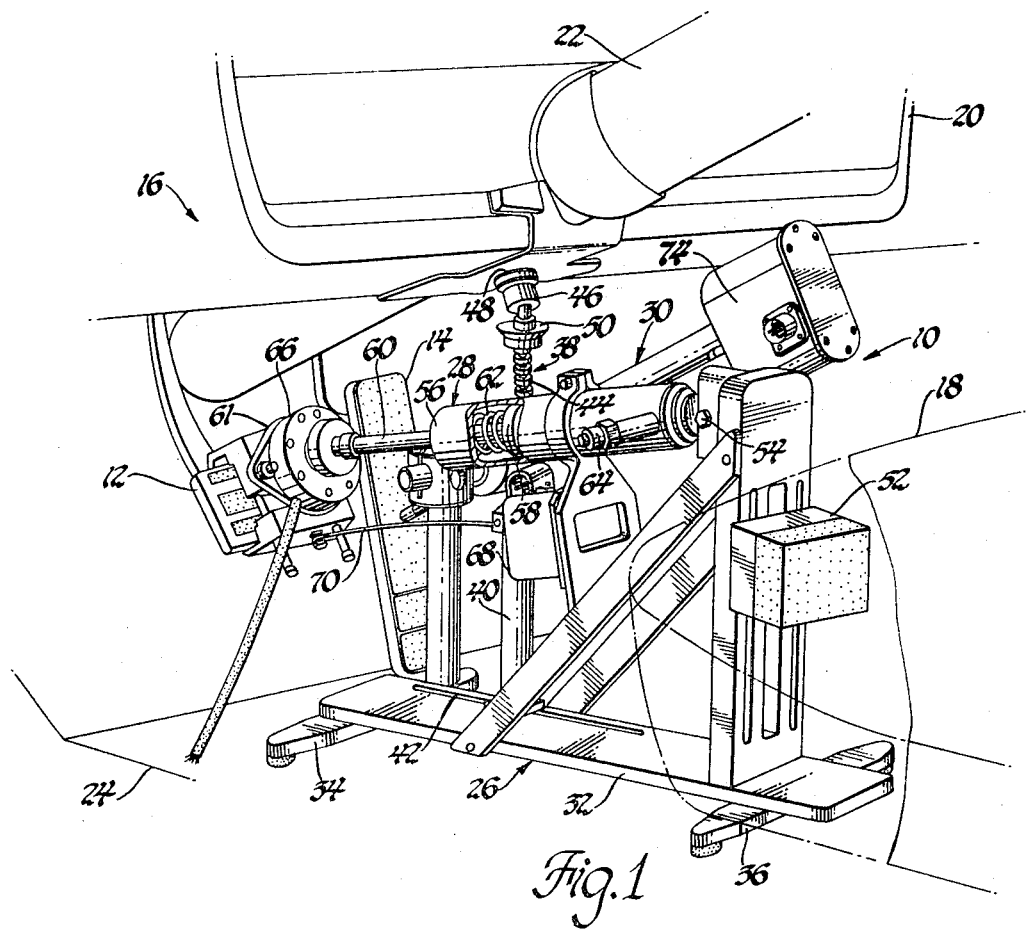

United States Patent
Pirrello et al.

[15] 3,662,593
[45] May 16, 1972

[54] TEST APPARATUS FOR DEPRESSING VEHICLE BRAKE AND ACCELERATOR PEDALS

[72] Inventors: Antonio Pirrello, Lincoln Park; Robert Campbell, Roseville, both of Mich.

[73] Assignee: General Motors Corporation, Detroit, Mich.

[22] Filed: Nov. 23, 1970

[21] Appl. No.: 91,893

[52] U.S. Cl..................................73/132, 73/116, 74/2, 74/482, 254/DIG. 5
[51] Int. Cl. ........................................G05g 21/00
[58] Field of Search..............73/132, 116, 117, 117.2, 117.3; 254/DIG. 5; 74/2, 59, 482, 481

[56] References Cited

UNITED STATES PATENTS 3,168,933    2/1965    Thorner..............................74/482 X
3,465,577    9/1969    Donovan..................................73/116

Primary Examiner—Richard C. Queisser
Assistant Examiner—Marvin Smollar
Attorney—Jean L. Carpenter and Paul Fitzpatrick

[57] ABSTRACT

Apparatus for depressing the accelerator and brake pedals of a vehicle. The apparatus includes a test stand that is rigidly secured in the vehicle at a position proximate the accelerator and brake pedals for supporting accelerator and brake pedal actuators.

The accelerator actuator includes a threaded shaft that is rotatably driven by a motor and engaged by a pawl so as to move axially as it is rotated, the threaded shaft being drivably coupled to the accelerator pedal so as to depress and release the accelerator pedal in accordance with the rotation of the threaded shaft. A solenoid is provided for disengaging the pawl from the threaded shaft and the threaded shaft is spring biased so as to release the accelerator pedal when the pawl is disengaged from the threaded shaft by the solenoid.

The brake pedal actuator includes a pneumatic cylinder containing a piston that is drivably coupled to the brake pedal of the vehicle so as to depress and release the brake pedal of the vehicle in accordance with the introduction of a pressurized fluid to the pneumatic cylinder.

3 Claims, 3 Drawing Figures

INVENTORS
Antonio Pirrello, &
Robert Campbell
BY
Paul Fitzpatrick
ATTORNEY

INVENTORS
Antonio Pirrello, &
BY Robert Campbell
Paul Fitzpatrick
ATTORNEY

TEST APPARATUS FOR DEPRESSING VEHICLE BRAKE AND ACCELERATOR PEDALS

The subject invention relates to vehicle test apparatus and, in particular, to apparatus for manipulating the brake and accelerator pedals of a vehicle.

Virtually all passenger vehicles designed for highway use are provided with hydraulic brakes that are operated by a brake pedal which is positioned near the vehicle floor so as to be depressed by the foot of the vehicle driver. Upon depressing the brake pedal, the hydraulic pressure in the brake system is increased so as to stop the vehicle. When the brake pedal is released, the residual hydraulic pressure causes the return of the brake pedal to an inoperative position. The return of the brake pedal is further facilitated by providing various springs which bias the brake pedal to the inoperative position. Accordingly, the force which is required to depress the brake pedal progressively increases, though perhaps at a nonlinear rate, as a function of the brake pedal position.

On the other hand, the accelerator pedal of the vehicle is customarily connected through a relatively complex linkage to the throttle plate of an internal combustion engine so that when the accelerator pedal is depressed the corresponding change in throttle plate position causes the engine to increase the speed of the vehicle. However, when the accelerator pedal is released the only forces which return the accelerator pedal to an inoperative position are those forces which are provided by biasing springs provided for this purpose.

Since the accelerator pedal is normally held in a partially depressed position by the vehicle driver for extended periods of time during the operation of the vehicle, the accelerator pedal and the connecting linkages are designed so that a relatively small force is required to maintain the accelerator pedal in a partially depressed position but a significantly higher force is required to initiate movement of the accelerator pedal to a more depressed position. However, once the accelerator pedal is placed in motion a relatively low force is required to maintain the accelerator pedal in motion.

The operation of the accelerator pedal is thus analogous to the phenomenon known as "sticking friction," as once the accelerator pedal is allowed to become motionless a disproportionately large force is required to start it in motion. However, the nonuniform force levels which are required to change the position of the accelerator pedal are very desirable as the vehicle driver is thus permitted to maintain a relatively constant speed of the vehicle for long periods of time by expending a minimum effort to hold the accelerator pedal in a relatively fixed position.

In the vehicle testing art these differences between the operation of the brake and accelerator pedals of a vehicle have resulted in the development of different actuating mechanisms for depressing these pedals in a vehicle. Since relatively high force levels are required to depress the brake pedal, it has heretofore been a practice to depress the brake pedal with a pneumatic actuator during braking tests. For example, to determine the stopping distance of a vehicle it is customary to operate the vehicle on a highway at a constant speed and at a predetermined starting point introduce a sudden charge of pressurized fluid into a pneumatic actuator so as to fully depress the brake pedal. After the vehicle has been stopped, the distance between the point where the brakes were applied to the point where the vehicle has stopped is measured as an indication of the vehicle's stopping ability.

However, to control the speed of the vehicle on a chassis dynamometer it has heretofore been the practice to merely manipulate the accelerator pedal of the vehicle, the brake pedal being left unused. Since the accelerator pedal needs to be very precisely controlled to maintain precise control of the vehicle speed, actuators which have heretofore been employed to depress the accelerator pedal have customarily incorporated an electric motor that is drivably coupled to the acceleration pedal so that when the motor rotates in a first direction an actuating mechanism depresses the accelerator pedal and when the motor rotates in the direction opposite to the first the actuating mechanism releases the accelerator pedal.

While both AC and DC motors have been employed in test devices of this nature, the actuators employed by prior art test devices have usually required that the motors be operated in a semistalled condition in which they must continuously develop a torque. That is, when the accelerator pedal is partially depressed the force that is required to maintain the accelerator pedal in the depressed position must be continuously generated by the motor in these prior systems. Accordingly, a continuous voltage, and hence supply of power, must be provided the motor at all times while the accelerator pedal is depressed.

Due to the aforedescribed forces which are required to change the position of the accelerator pedal a change in the vehicle speed can only be achieved by a disproportionately large change in the voltage which is applied to the motor and, once the accelerator pedal is in motion, a considerably smaller voltage must be applied to the motor to prevent moving the accelerator pedal a greater distance than is desired. It has therefore been very difficult to design a servomechanism which is capable of controlling the speed of the vehicle in accordance with an electrical signal as the widely varying force requirements of the accelerator pedal have required that such servomechanisms contain a great deal of damping so as to prevent the servomechanism from operating in an unstable condition in which the accelerator pedal is oscillated between the extremes of fully depressed and fully released conditions.

It is therefore an object of this invention to provide a motor-driven pedal depressing actuator which does not require that the motor develop a holding torque to maintain the pedal in a depressed position and which may be employed in a servomechanism for controlling the speed of a vehicle in accordance with an electrical signal.

It is another object of this invention to provide a motor-driven pedal depressing actuator which does not require that the motor develop a holding torque to maintain the pedal in a depressed position and which instantly releases the pedal in the event of a power failure or other emergency condition.

It is another object of this invention to provide a DC motor-driven actuator which depresses a pedal in accordance with a series of electrical pulses and which does not require that the motor develop a holding torque to maintain the pedal in a depressed position.

It is a further object of this invention to provide apparatus which may be employed in a servomechanism to control the speed of the vehicle in accordance with an electrical signal by depressing the brake and accelerator pedals of the vehicle.

Figure 2:
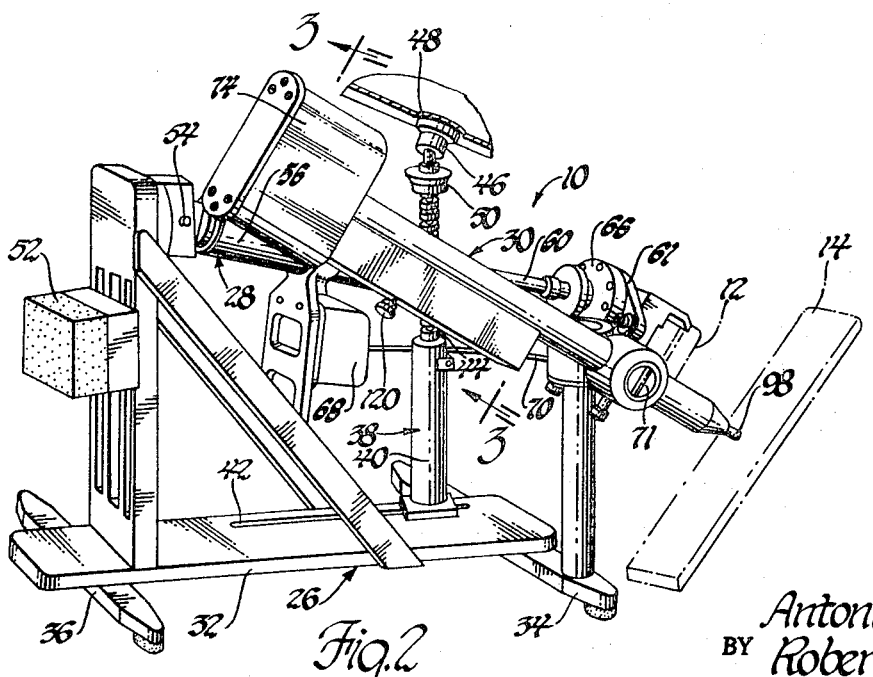
Figure 3:
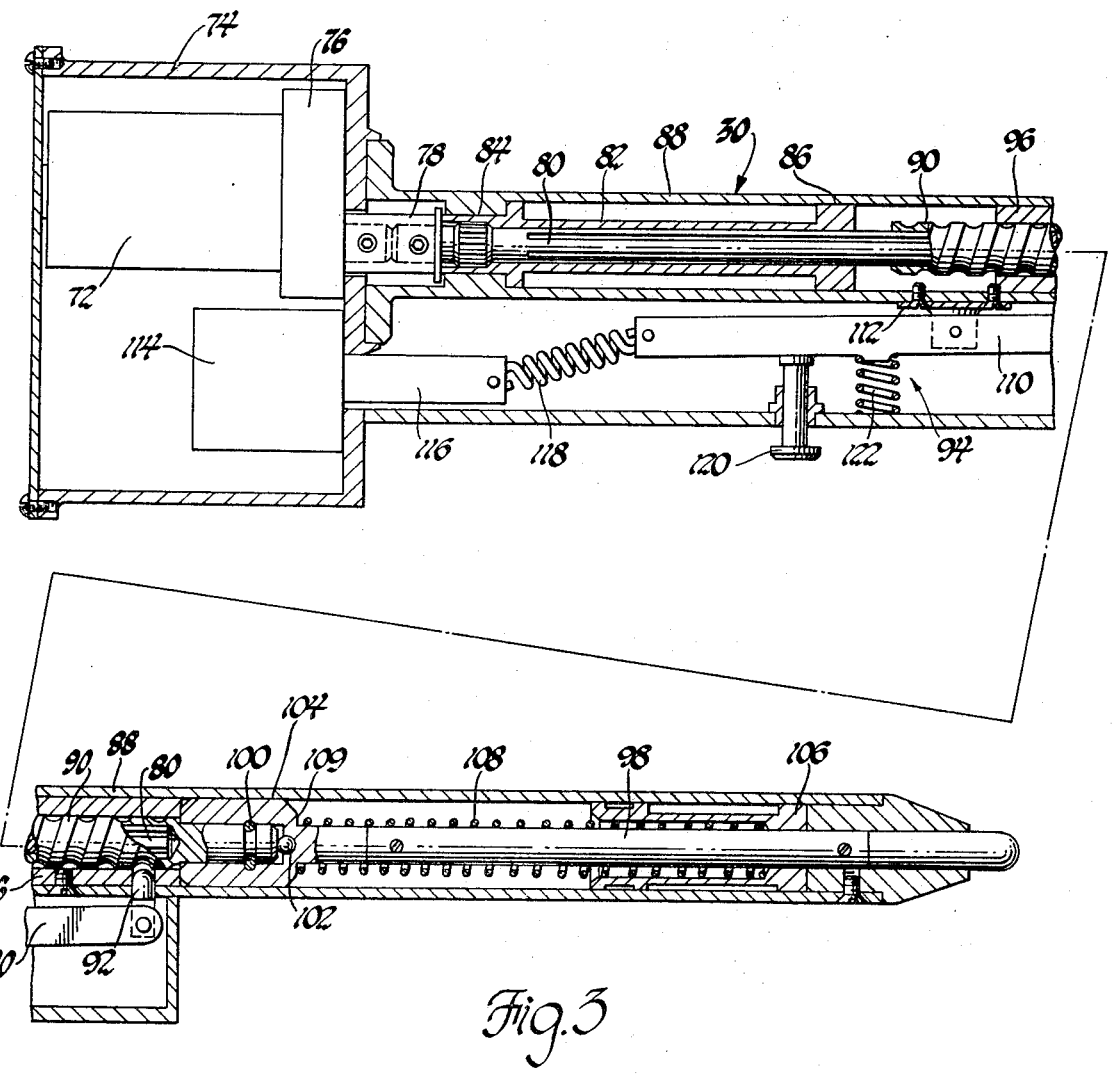

The foregoing and other objects and advantages of the subject invention will be apparent from the following description and the accompanying drawings, in which:

FIGS. 1 and 2 are side views of a test fixture incorporating the principles of the subject invention and including brake and accelerator pedal actuators; and FIG. 3 is a cross-sectional view of the accelerator pedal actuator taken along the line 3—3 in FIG. 2.

As is shown in FIG. 1, the subject apparatus comprises a test fixture 10 which manipulates the brake and accelerator pedals 12 and 14 of a motor vehicle 16, a partial view of which is shown in FIG. 1. The portions of the motor vehicle 16 which are illustrated in FIG. 1 include a driver's seat 18, a dashboard 20, a steering column 22, and a floor 24 of the passenger compartment. The test fixture 10 is positioned on the floor 24 between the pedals 12 and 14 and the seat 18 and includes a test stand 26 that supports a brake pedal actuator 28 and an accelerator pedal actuator 30. While the drawings do not illustrate a power source for supplying energy to the actuators 28 and 30 they may, by way of example and without limitation, be energized by apparatus similar to that disclosed in a United States patent application filed this day by Robert Campbell, identified as patent application Ser. No. 91,892 and assigned to the same assignee as the instant application.

Persons versed in the art will appreciate that the test stand 26 may be of any suitable configuration which provides a rigid support for the brake pedal actuator 28 and the accelerator pedal actuator 30. However, in the illustrated embodiment the test stand 26 includes a triangular frame 32 that is supported on the floor 24 by front and rear legs 34 and 36. The test stand 26 is rigidly secured against vertical movement in the illustrated position by an adjustable column 38 which includes a lower member 40 that is slidably secured in a groove 42 of the frame 32 and internally threaded to receive a threaded upper member 44 of the column 38. A universally pivoted connecting member 46 having a nonskid upper surface 48 is connected to the uppermost end of the threaded member 44 so that when the threaded member 44 is rotated, as by manual rotation of an enlarged gripping surface 50 that forms a part of the member 44, the length of the column 38 may be increased sufficiently to clamp the test stand 26 in a rigid position between the floor 24 and the dashboard 20 of the vehicle 16. A restraining block 52 is provided for preventing movement of the test stand 26 away from the pedals 12 and 14 when the actuators 28 and 30 depress the pedals 12 and 14. Since the position of the seat 18 relative to the pedals 12 and 14 will almost invariably be adjustable, the adjustment mechanism of the seat 18 permits moving the seat 18 to a position where it may encounter the restraining block 52 so as to prevent movement of the test stand 26 when the actuators 28 and 30 are in operation.

As shown in FIG. 1, the brake pedal actuator 28 is pivotally secured to the test stand 26 by a pin 54 so as to readily be aligned with the brake pedal 12. The brake pedal actuator 28 includes a pneumatic cylinder 56 in which is slidably positioned a piston 58 that is drivably coupled to the brake pedal 12 through a piston rod 60 and a universal mounting assembly 61. A spring 62 is also provided in the brake pedal actuator 28 to bias the piston 58 away from the brake pedal 12 so that the brake pedal 12 is normally held in an inoperative position in which it is not depressed. Of course, should a pressurized fluid be introduced to the cylinder 56 through a hose coupling 64 which is provided for this purpose the biasing force of the spring 62 is readily overcome and the brake pedal 12 is depressed in accordance with the fluid pressure in the cylinder 56.

While the test fixture 10 is primarily intended for use in a servomechanism which controls the speed of the vehicle 16, persons versed in the art will appreciate that under some test conditions it may be desirable to apply a predetermined force to the brake pedal 12. Accordingly, the universal mounting assembly 61 illustrated in FIG. 1 includes a force transducer 66 which may be used to monitor the force which is applied to the brake pedal 12 by the brake pedal actuator 28. In addition, certain other tests may arise in which it is desirable to know the distance traveled by the brake pedal 12 when it is depressed by the brake pedal actuator 28. A distance transducer 68 that is connected to the universal mounting 61 by a wire 70 is provided for this purpose. While the distance transducer 68 may be of several diverse types that are commercially available, it may, for example, be of a type in which the wire 70 is connected to a spring-biased wiper arm of a potentiometer so that as the brake pedal 12 is depressed the wire 70 rotates the wiper arm of the potentiometer to give an indication of the pedal 12 travel.

The accelerator pedal actuator 30, illustrated in detail in FIG. 3, is rigidly secured to the test stand 26 by a pivotally mounted clamp 71 and includes a DC motor 72 within a motor housing 74 drivably connected through a gear head 76 and a coupling member 78 to a splined shaft 80. The splined shaft 80 is supported by and secured to a guide member 82 which has first and second bearing surfaces 84 and 86 that cooperate with a shaft housing 88, which is secured to the motor housing 74, so as to maintain the alignment of the splined shaft 80 as it is driven by the motor 72.

The splined shaft 80 is slidably engaged by a threaded shaft 90 so that rotation of the motor 72 imparts rotation to the threaded shaft 90. A pawl 92 is positioned by a actuator release assembly 94 so as to engage the threaded portion of the threaded shaft 90. Rotation of the threaded shaft 90 by the motor 72 thus causes the threaded shaft 90 to move axially so long as it is engaged by the pawl 92. A bushing member 96 is provided for maintaining the alignment of the threaded shaft 90 relative to the splined shaft 80.

An output shaft 98 is provided for coupling the axial movement of the threaded shaft 90 to the accelerator pedal 14, as shown in FIG. 2. The output shaft 98 is restrained from moving axially relative to the threaded shaft 90 by a retaining ring 100. In addition, a ball bearing 102 acts as a thrust bearing to prevent rotation of the threaded shaft 90 from rotating the output shaft 98. Accordingly, as the threaded shaft 90 is rotated in a first direction, the output shaft 98 is moved so as to extend further from the shaft housing 88, as shown by dashed lines in FIG. 3. As the threaded shaft 90 is rotated in a second direction that is counter to the first direction the resulting axial movement of the threaded shaft 90 retracts the output shaft 98 into the shaft housing 88. Proper axial alignment of the output shaft 98 relative to the threaded shaft 90 is maintained by both a bearing surface 104 that is formed in the output shaft 98 and by a spring retaining member 106 that houses a spring 108, which spring is maintained in compression between an enlarged portion 109 of the output shaft 98 and the spring retaining member 106. The purpose of the spring 108 will subsequently be explained in detail in conjunction with the actuator release assembly 94, which includes a trip arm 110 that is connected at one end to the pawl 92 and pivotally supported by a support member 112, a solenoid 114 having an iron core 116 that is connected to the trip arm 110 by a spring 118, a manually actuable trigger 120 for manually rotating the trip arm 110 counterclockwise about the support member 112, and a spring 122 for biasing the trip arm 110 counterclockwise about the support member 112 so as to retract the pawl 92 from engagement with the threaded shaft 90.

Prior to placing the accelerator pedal actuator 30 in operation, the solenoid 114 is deenergized and the iron core 116 is in its illustrated extended position. Accordingly, the spring 122 maintains the trip arm 110 biased in the illustrated counterclockwise position so that the pawl 92 does not engage the threaded shaft 90. Since the pawl 92 does not restrain axial motion of the threaded shaft 90, the spring 108 biases the threaded shaft 90 away from the accelerator pedal 14 and toward the motor 72, causing the threaded shaft 90 to slide axially along the splined shaft 80 until the output shaft 98 encounters the bushing member 96 as shown in FIG. 3.

To place the accelerator pedal actuator 30 in operation, the solenoid 114 is energized by a suitable power source (not shown) so as to retract the iron core 116 and extend the spring 118. The resulting tension force in the spring 118 causes the trip arm 110 to be rotated about the support member 112 so as to move the pawl 92 into engagement with the threaded portion of the threaded shaft 90. Accordingly, if the motor 92 is rotated after the solenoid 114 is energized, the motor rotation rotates the splined shaft 80 and the threaded shaft 90 so as to effect axial movement of the threaded shaft 90 relative to the pawl 92, the axial movement of the threaded shaft 90 causing the output shaft 98 to depress the accelerator pedal 14 as it extends from the shaft housing 88. As the output shaft 98 is extended from the shaft housing 88, the spring 108 is compressed. However, the engagement of the pawl 92 in the threaded shaft 90 prevents retraction of the output shaft 98 by the spring 108 even when the motor 72 is deenergized. The motor 72 must therefore be driven in the opposite direction to retract the output shaft 98 whenever the pawl 92 engages the threaded shaft 90.

In the event it is desired to rapidly retract the output shaft 98 into the shaft housing 88 this may be achieved by merely deenergizing the solenoid 114. As the solenoid 114 is deenergized, the iron core 116 releases the tension in the spring 118 so as to allow the trip arm 110 to be rotated counterclockwise by the spring 122, retracting the pawl 92 from engagement with the threaded shaft 90. As soon as the pawl 92 is disengaged from the threaded shaft 90, the spring 108 returns the output shaft 98 to its illustrated fully retracted position in which it abuts the bushing member 96. Of course, in the event of a power failure the solenoid 114 is deenergized and the output shaft 98 is retracted in the fashion just described.

Should the solenoid 114 not retract the pawl 92 from the threaded shaft 90 when desired, or another emergency arise, the pawl 92 may be disengaged from the shaft 90 by manually depressing the trigger 120. As the trigger 120 is depressed, the forces in the tension spring 118 are overcome and the trip arm 110 is rotated counterclockwise manually so as to retract the pawl 92 and allow the spring 108 to retract the output shaft 98 into the actuator housing 88.

It is thus apparent that the subject apparatus may be employed in the vehicle testing art to manipulate the accelerator and brake pedals of a vehicle in a very precise fashion, though persons versed in the art will appreciate that various modifications of the subject apparatus may be made without departing from the spirit of the invention.

What is claimed is:

1. Apparatus for depressing the accelerator pedal of a vehicle comprising, in combination, a test stand, means for rigidly securing the test stand relative to the vehicle and proximate the accelerator pedal, and accelerator actuator means supported by the test stand for depressing the accelerator pedal, the actuator means including a housing, a threaded shaft positioned for axial movement within the housing, means drivably coupling the shaft to the accelerator pedal effective to depress the accelerator pedal when the shaft is moved in a first axial direction and to release the accelerator pedal when the shaft is moved in a second axial direction that is opposite the first axial direction, pawl means for selectively engaging the threaded portion of the shaft so as to effect axial movement of the shaft when the shaft is rotated, a reversible motor having a rotatable armature drivably coupled to the shaft whereby rotation of the motor armature effects rotation of the shaft, and means for biasing the shaft in the second axial direction so that when the pawl means disengages the threaded portion of the shaft the shaft is rapidly moved in the second axial direction by the biasing means effective to release the accelerator pedal.

2. Apparatus for depressing the accelerator pedal of a vehicle comprising, in combination, a test stand, means for rigidly securing the test stand relative to the vehicle and proximate the accelerator pedal, and an accelerator pedal actuator supported by the test stand for depressing the accelerator pedal, the actuator including a housing, a threaded shaft having external threads and internal splines positioned for axial movement within the housing, means coupling the threaded shaft to the accelerator pedal effective to depress the accelerator pedal when the threaded shaft is moved in a first axial direction and to release the accelerator pedal when the threaded shaft is moved in a second axial direction opposite the first axial direction, a splined shaft positioned in the housing and having external splines that are positioned so as to engage the internal splines of the threaded shaft whereby rotation of the splined shaft imparts rotation to the threaded shaft, means for preventing axial movement of the splined shaft, a reversible motor having a rotatable armature that is drivably coupled to the splined shaft for rotating both the splined shaft and the threaded shaft, a pawl for selectively engaging the threads on the threaded shaft effective to impart axial movement to the threaded shaft when the threaded shaft is rotated by the motor, rotation of the motor in a first angular direction when the pawl engages the threaded shaft causing the threaded shaft to move in the first axial direction so as to depress the accelerator pedal and rotation of the motor in a second angular direction opposite the first angular direction when the pawl engages the threaded shaft causing the threaded shaft to move in the second axial direction so as to release the accelerator pedal, biasing means for biasing the threaded shaft in the second axial direction, and control means for controlling the engagement of the threaded shaft by the pawl, the control means including a solenoid that is effective when energized to bias the pawl into engagement with the threaded shaft and spring means for biasing the pawl out of engagement with the threaded shaft when the solenoid is deenergized whereby rotation of the motor when the solenoid is energized effects axial movement of the threaded shaft so as to depress and release the accelerator pedal, the biasing means moving the threaded shaft in the second axial direction so as to release the accelerator pedal when the pawl is out of engagement with the threaded shaft regardless of whether the motor is driving the threaded shaft.

3. Apparatus for depressing the brake and accelerator pedals of a vehicle comprising, in combination, a test stand, means for rigidly securing the test stand relative to the vehicle and proximate the brake and accelerator pedals, an accelerator pedal actuator pivotally supported by the test stand for depressing the accelerator pedal, the accelerator pedal actuator including a housing, a threaded shaft positioned for axial movement within the housing, a pawl for selectively engaging the threaded shaft, a solenoid for controlling the engagement of the threaded shaft by the pawl, means coupling the solenoid to the pawl effective to move the pawl into engagement with the threaded portion of the shaft when the solenoid is energized, thereby causing rotation of the threaded shaft to move the threaded shaft axially when the shaft is engaged by the pawl, means for biasing the pawl out of engagement with the threaded shaft when the solenoid is deenergized so as to prevent the pawl from causing the shaft to move axially when the shaft is rotated and the solenoid is deenergized, a reversible motor having an armature, coupling means for drivably coupling the motor armature to the shaft, the coupling means including splined shaft means rotatably driven by the motor and slidably coupled to the threaded shaft whereby rotation of the motor effects a corresponding rotation of the threaded shaft, means for drivably coupling the threaded shaft to the accelerator pedal effective to depress the accelerator pedal when the threaded shaft is moved in a first axial direction and to release the accelerator pedal when the threaded shaft is moved in a second axial direction that is opposite the first axial direction, and biasing means for biasing the threaded shaft in the second axial direction so as to prevent depressing of the accelerator pedal until the threaded shaft is engaged by the pawl and the threaded shaft is rotated in a direction which effects axial movement of the threaded shaft in the first axial direction, and a brake pedal actuator that is pivotally supported by the test stand for depressing the brake pedal, the brake pedal actuator including a pneumatic cylinder, a piston slidably positioned in the cylinder, means coupling the piston to the brake pedal effective to depress the brake pedal when the piston is moved in a first direction and to release the brake pedal when the piston is moved in a second direction that is opposed to the first direction, means for connecting the cylinder to a source of pressurized fluid whereby pressurized fluid may be introduced to the cylinder adjacent the piston effective to move the piston in the first direction so as to depress the brake pedal, and means for biasing the piston in the second direction effective to prevent the brake pedal actuator from depressing the brake pedal until pressurized fluid is introduced into the cylinder.

* * * * *